United States Patent [19]
Hsia

[11] Patent Number: 5,961,592
[45] Date of Patent: Oct. 5, 1999

[54] SCREEN IDENTIFICATION SYSTEM

[75] Inventor: Hanna Hsia, Mission Viejo, Calif.

[73] Assignee: NetManage, Inc., Cupertino, Calif.

[21] Appl. No.: 09/154,912

[22] Filed: Sep. 17, 1998

Related U.S. Application Data

[62] Division of application No. 08/675,592, Jul. 3, 1996, Pat. No. 5,862,341.

[51] Int. Cl.⁶ .................................................. G06F 13/00
[52] U.S. Cl. .......................... 709/217; 395/682; 345/431; 345/433; 345/441; 345/348; 345/526; 709/203; 709/217; 709/219; 709/220
[58] Field of Search ...................... 395/682; 345/431, 345/433, 441, 348, 526; 709/203, 217, 219, 220

[56] References Cited

U.S. PATENT DOCUMENTS

| | | | |
|---|---|---|---|
| 3,872,444 | 3/1975 | Cleveland et al. | 340/172.5 |
| 4,393,269 | 7/1983 | Konheim et al. | 178/22.08 |
| 4,910,704 | 3/1990 | Gemma | 345/526 |
| 4,967,190 | 10/1990 | Fujisaki et al. | 340/700 |
| 5,325,377 | 6/1994 | Tuttle | 371/67.1 |
| 5,384,910 | 1/1995 | Torres | 345/352 |
| 5,420,968 | 5/1995 | Johri | 345/433 |
| 5,430,840 | 7/1995 | Berg et al. | 395/161 |
| 5,530,961 | 6/1996 | Janay et al. | 395/153 |
| 5,617,528 | 4/1997 | Stechmann et al. | 395/326 |
| 5,862,341 | 1/1999 | Hsia | 395/200.58 |

*Primary Examiner*—Moustafa M. Meky
*Attorney, Agent, or Firm*—Arter & Hadden LLP; Steven C. Sereboff

[57] ABSTRACT

A method of identifying computer screens is disclosed. The method is particularly useful in identifying IBM host screens in script creation and playback. According to the method, a signature is composed for a given screen. The signature comprises characteristics of a given screen which differentiate that screen from substantially different screen displays. For an IBM host screen, signature composition is based upon the screens protected fields. The protected fields are further processed by removing transient information such as the date and time.

24 Claims, 7 Drawing Sheets

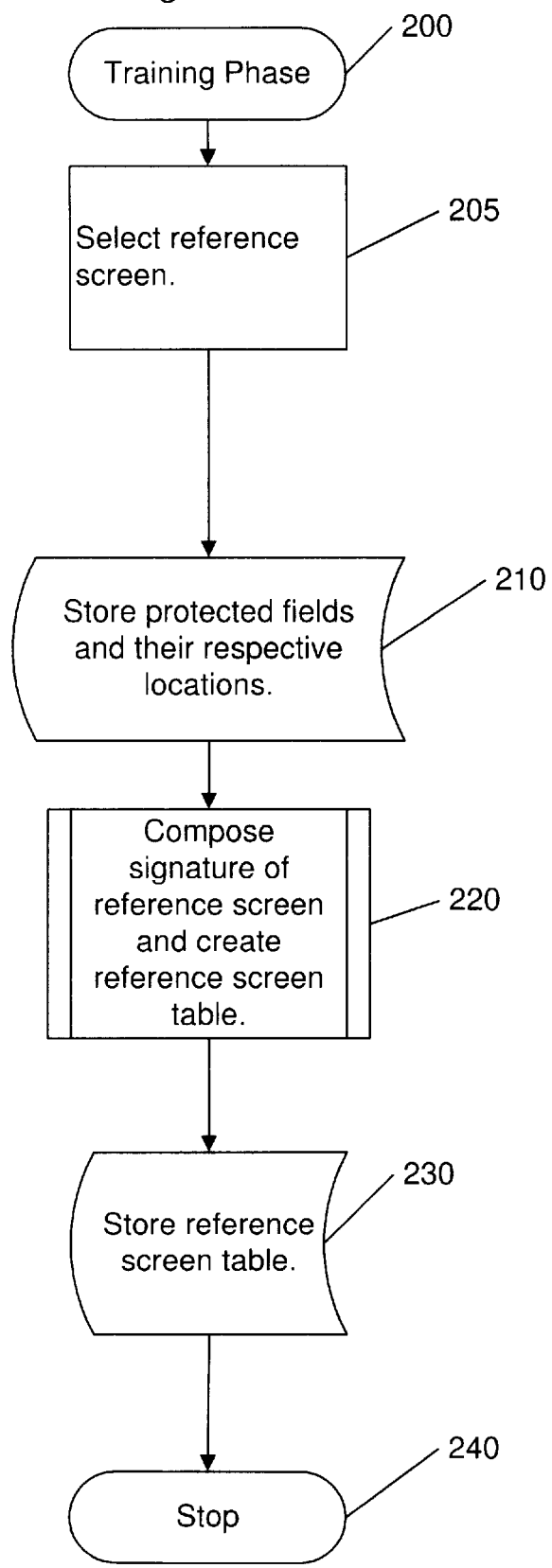

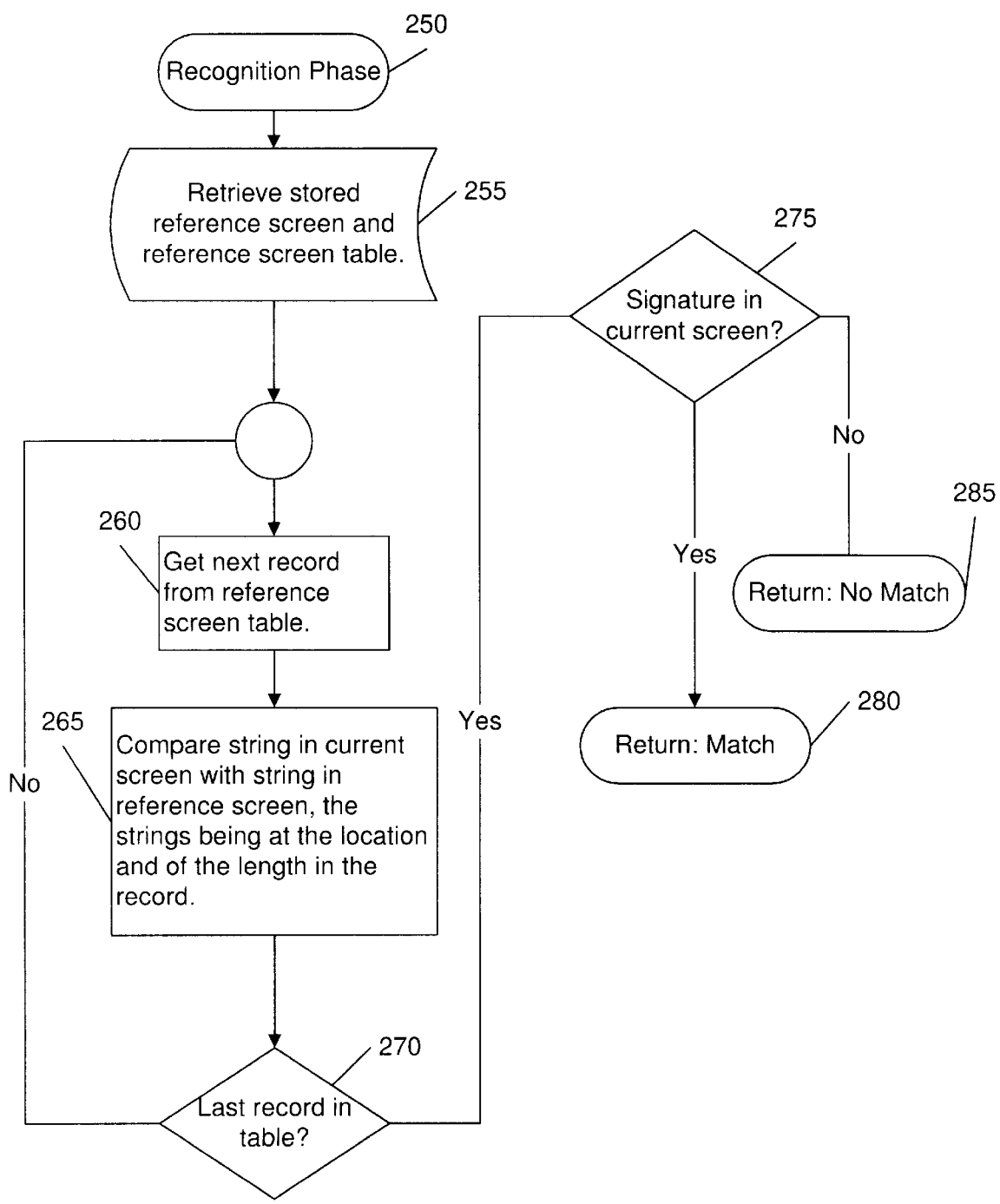

SCREEN IDENTIFICATION SYSTEM

This is a division of application Ser. No. 08/675,592 filed on Jul. 3, 1996, now U.S. Pat. No. 5,862,341.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to PC to host communications, and more particularly to methods of identifying host screens by a PC.

2. Description of Related Art

Today's enterprise features universal personal and network computing. In most cases the same enterprise is a long-term user of and investor in International Business Machines Corp. (Armonk, N.Y.) ("IBM") host computing systems and technology. In the early 1980s, the arrival of the Personal Computer (PC) in IBM host computing environments created a PC-to-IBM host connectivity market. Today this hardware/software market is approximately a $1 billion segment of the networking industry.

The PC-to-IBM host connectivity market has gone through several transitions over the past decade. In the early 1980s the market formed around the replacement of Control Unit Terminals ("CUT mode devices") with hardware/software combinations such as the 'IRMA' card. The first major transition in this market began in 1985 with IBM's introduction of distributed function terminal ("DFT") mode in its cluster controllers (3×74), terminals, and modified PCs. PC-to-host connectivity vendors responded by developing DFT mode software for PC-DOS, an effort which required development of complete SNA protocol engines.

By the late 1980s many organizations were swept up in the process of connecting PCs together into Local Area Networks (LANs). This gave rise to another transition in the market, the connections of LAN-attached PCs to IBM hosts. The use of connectivity methodologies that deny PCs powerful access to local and wide area networks (such as coax/twinax to fixed function cluster controllers) is on the decline, being replaced by gateway and direct connect configurations that treat IBM hosts as one of several inter-network servers.

In 1990 the transition in the Intel PC install base to Windows 3.X began. Windows is a product of Microsoft Corp. (Redmond, Wash.). The effect upon the IBM host connectivity market was immediate and profound. New, high growth companies emerged that specialized in Windows-to-IBM host connectivity. For the first time, changes in the desktop computing environment begat significant changes in the use of IBM host computers.

In the typical PC-DOS-to-IBM host connectivity installation, terminal emulation software allows operation of the PC as a dual function device: both PC-DOS application processor and host terminal. The typical PC-DOS based 3270 or 5250 product may also include other features for host connectivity such as application programming interfaces and/or file transfer software. However, the limitations of PC-DOS itself (memory management and user interface in particular) hinder general development and deployment of more powerful PC-to-host connectivity systems.

The widespread adoption of Windows 3.X on Intel Desktop PCs created a market for more innovative PC-to-IBM host connectivity software. Graphical User Interface technology has been applied to the task of simplifying the look and feel of older host applications. Enhanced mode memory management allows for more reliable deployment of underlying PC-to-host communications technology such as Advanced Program to Program Communications/Logical Unit ("APPC/LU") 6.2 engines. Task switching enables the concurrent use of various PC-to-host applications and services on a single desktop. All of these innovations represent incremental improvement over the DOS-to-IBM host computing environment.

Although IBM host applications can be written having a more contemporary user interface, most IBM host applications are old, and it is difficult to make significant changes to them. These older IBM host applications are commonly known as "legacy applications."

One feature of legacy applications and most applications on IBM hosts is that screen displays follow certain standards. One standard is that a screen is divided into a number of "fields." Fields may be "protected" or "unprotected." Protected fields display matter from the application, but are not editable by the user. Unprotected fields are editable by the user. As an example, consider an application into which a user inputs form information. Each label of the form would be a protected field. Each input field (where the user types in corresponding information) would be an unprotected field.

One defining characteristic of legacy applications is that they are navigated linearly and sequentially. Thus, where some IBM host applications may be accessed using Software Query Language ("SQL"), legacy applications typically cannot. Furthermore, SQL access is generally limited to relational database management systems ("RDBMSs").

Yet, although the legacy applications are old, the data stored with them and typically accessible only through them can be quite new and relevant. Thus, despite the age of the legacy applications, there continues to be a great need to use them.

There have been suggestions to automate and simplify PC-based navigation of IBM host applications. One form of navigation requires recognition by the PC of an IBM host screen. This arises because, during navigation, the PC will receive screens from the host. Upon receipt, the PC may then respond appropriately. Because screens may change from time to time, it is desirable to ensure that the expected screen has been received before responding or taking other action.

It is therefore an object of the present invention to provide a method for reliably and efficiently identifying IBM host screens. This should be done in an economical fashion requiring a minimum of modification to legacy applications, IBM hosts, PCs and PC applications.

These objects and others are provided by the screen identification method of the present invention.

SUMMARY OF THE INVENTION

The present invention provides an efficient and reliable method for identifying screens. In accordance with the method, during a training phase, a screen is selected as a reference screen. Then, based upon the contents of the reference screen a signature for the screen is identified.

A screen's signature is based primarily upon its protected fields. If the screen is blank, then the signature is set to a predetermined value, preferably NULL. If the screen is unformatted or has no protected fields, then the signature comprises a string of the first characters of the screen. Otherwise, the signature is some number of signature elements.

A signature element is derived from a selected protected field. Portions of the selected protected field which are unreliable or which might change from time to time are filtered out, and the remaining string is the signature element. For each signature element, a record of the starting position of the signature element and its length is added to a reference screen table.

The reference screen table and the reference screen are then stored for use in a recognition phase.

During the recognition phase, the contents of the current screen are analyzed and effectively compared against the signature of the reference screen. In particular, the records in the reference screen table are used to compare the current screen with the stored reference screen. For each record, the string in the reference screen at the record's position and of the record's length is compared to the string in the current screen at the record's position and of the record's length. If the current screen has the signature within appropriate limits, then the current screen is concluded to be the same as the reference screen.

DESCRIPTION OF THE DRAWINGS

These and other advantages of the present invention are best understood with reference to the drawings, in which, in varying detail:

FIG. 2A is a flow chart of a training phase of screen identification.

FIG. 2B is a flow chart of a recognition phase of screen identification.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.
Related Applications Co-pending application Ser. No. 08/639,788 filed Apr. 1996, still pending, discloses my method for navigating user screen in order to record and play back scripts. Co-pending application Ser. No. 08/708,095 filed Aug. 23, 1996, still pending, my method for accessing and manipulating the date resident in a non-PC host when operating on a document in a PC container application.

The Hardware Architecture of the Preferred Computer System

Figure 1:
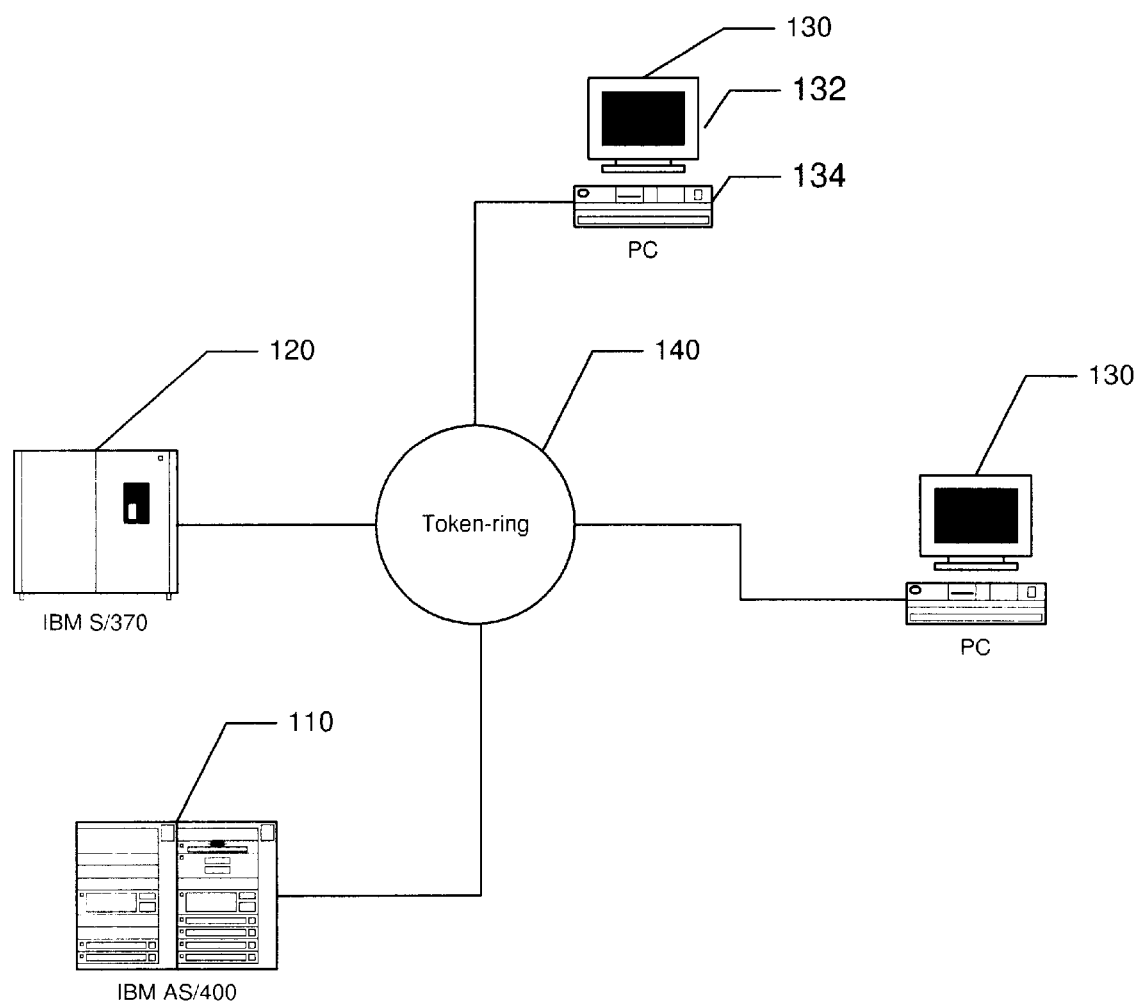
FIG. 1 is a block diagram of a computer system in accordance with the invention.

FIG. 1 shows an IBM AS/400 110, an IBM S/370 120, and two PCs 130 on a token ring network 140. The AS/400 110 is representative of a class of IBM midrange computers which includes the S/36 and S/38. The S/370 120 is representative of a class of IBM mainframe computers which includes the S/390. The IBM midrange and mainframe computers represent a class of products known as IBM hosts and will be so referred as such below. IBM hosts are characterized in that they are multi-user systems, wherein users typically access them through synchronous or bi-synchronous terminals. The terminals are typically dumb, in that they typically have little processing capability, such as the CUTs described above.

Terminals typically comprise a monitor for providing host display session output displays to the user, and an input device such as a keyboard for receiving user input. Thus, programs running on an IBM host which would interact with a user typically display data on the display of the user's terminal and receive input from the user through the terminal's keyboard.

The PCs 130 are preferably Intel-based personal computers using the Microsoft Windows 95 operating system, although other types of computers and operating systems are within the scope of the invention. The PCs 130 are representative of a class of computers which will be referred to herein as "guest computers." The guest computers are characterized in that they have the ability to access the IBM hosts through a special hardware interface and software interface, the software interface for emulating a dumb terminal typically comprising terminal emulation software. To the IBM host, the guest computers appear to be CUTs.

An important feature of the guest computers is that they receive display sessions from the IBM host, but rather than automatically displaying them, the guest computers receive the displays in a "host display session presentation space." With typical terminal emulation systems on PCs 130, the host display session presentation space is displayed directly to the monitor 132. However, because of the additional processing capabilities of the guest computer over a dumb terminal, the terminal emulation program can affect other results.

The PCs 130 preferably have a monitor 132 on which displays are presented to a user, and a central processing unit 134 which stores the programs and data and processes them. The PCs 130 include user input devices such as a keyboard (not shown) and a mouse (not shown). Other input and output devices are within the scope of the invention.

The screen identification method of the invention comprises two parts: a training phase and a recognition phase. The method is particularly useful in recording and playing back scripts of PC interaction with an IBM host.

According to one embodiment of the invention, the method is practiced as a part of NS/Elite™ for Mainframe Access and NS/Elit™ for AS/400 Access, both available from NetSoft (Irvine, Calif.). These products are run on PCs and have functions referred to as Navigation Services. Navigation Services allows an administrator to record a script of how to navigate to and use IBM host screens, and allows a user to play back the script. The training phase of the invention is used by Navigation Services during script recording, and the recognition phase is used during script playback.

During script recording, as the administrator navigates through the IBM host environment, Navigation Services stores a "signature" of each new screen within the script.

During play back, Navigation Services uses the stored signatures to verify the proper operation of the script.

"Signature" means characteristics of a given screen display which differentiate the screen from substantially different screen displays. Generally, screens with identical protected fields are considered substantially the same. Also, screens which are substantially the same except for a display of the date, time or other transitory matter in a protected field are considered substantially the same.

The Training Phase

Referring now to FIG. 2A, there is shown a flow chart of the training phase of screen identification. In step 200 the method begins. In step 205, a reference screen is selected. This is preferably automatic, for example, whenever a new screen is displayed. Alternatively a reference screen may be selected manually, for example when the administrator pushes a host screen selection button generated by a PC application.

In step 210, the protected fields are stored as well as their respective locations. Alternatively, the entire reference screen may be stored. Storage may be on magnetic media in the PC 130 or otherwise as known in the art.

The particular format of the "location" is not important to the invention. Typically, a screen location is defined with reference to a particular place on the screen. For example, on an IBM host screen locations are one dimensional. The top left location is the reference position, and positions numbers are wrapped from the end of one line to the beginning of the next line. A location could also be, for example, two dimensional and defined as a line and character number (or position) on the line.

In step 220, the signature of the reference screen is composed (a "reference signature") and a reference screen table is created. Composition of signatures and creation of the reference screen table is considered a sub-process of the method, and is described further below. After the signature has been composed, then the reference screen table is stored (step 230). The reference screen table may be stored in magnetic media in the PC 130 or otherwise as known in the art.

The preceding steps 205–230 may be repeated as desired to store a number of screen signatures. This may occur, for example, during use of an IBM host application by an administrator. After the signatures are stored, the training phase is complete (step 240).

Composing a Signature

Figure 3A:
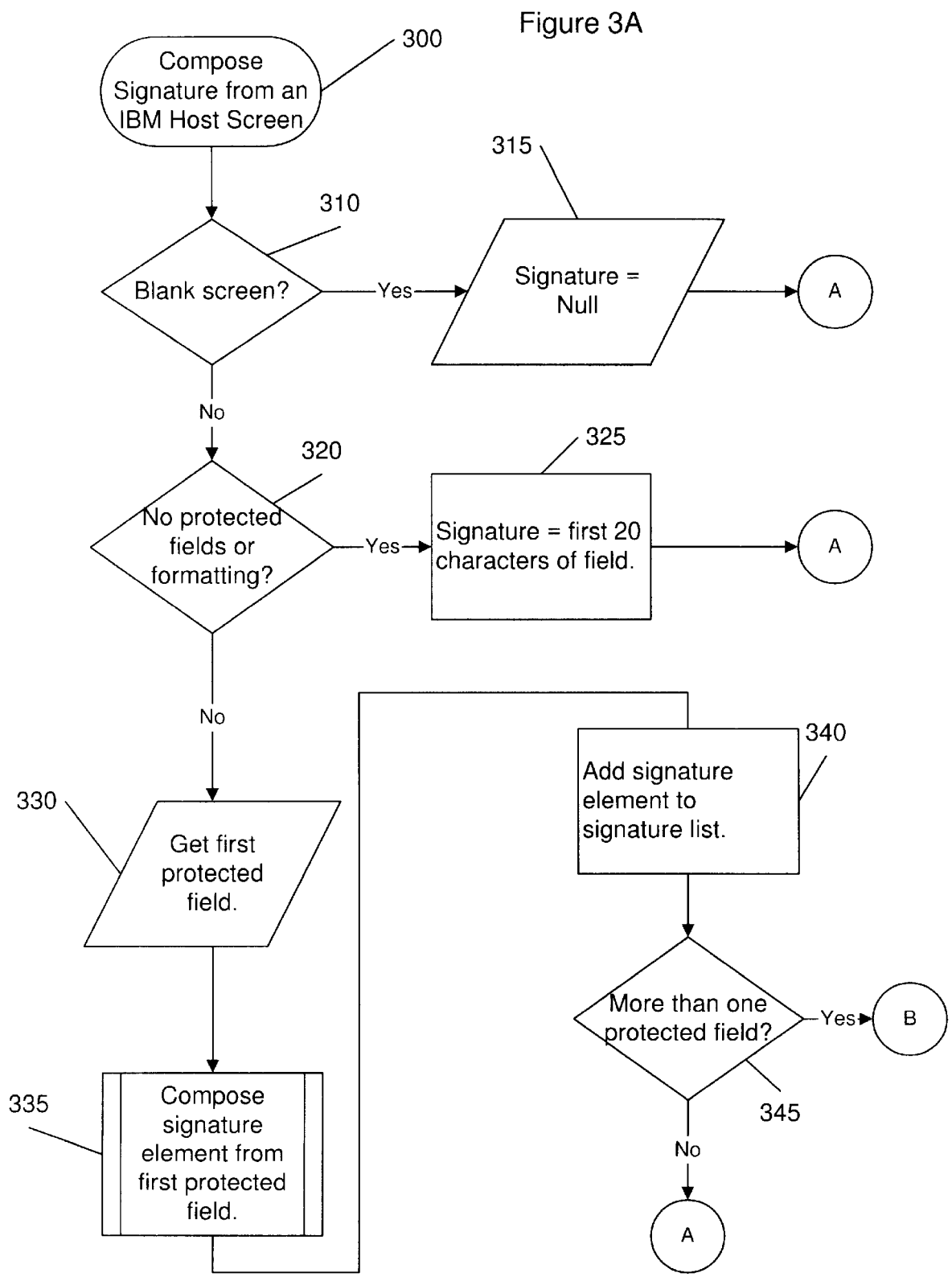
FIGS. 3A and 3B are a flow chart of a method of composing a signature from an IBM host screen.
Figure 3B:
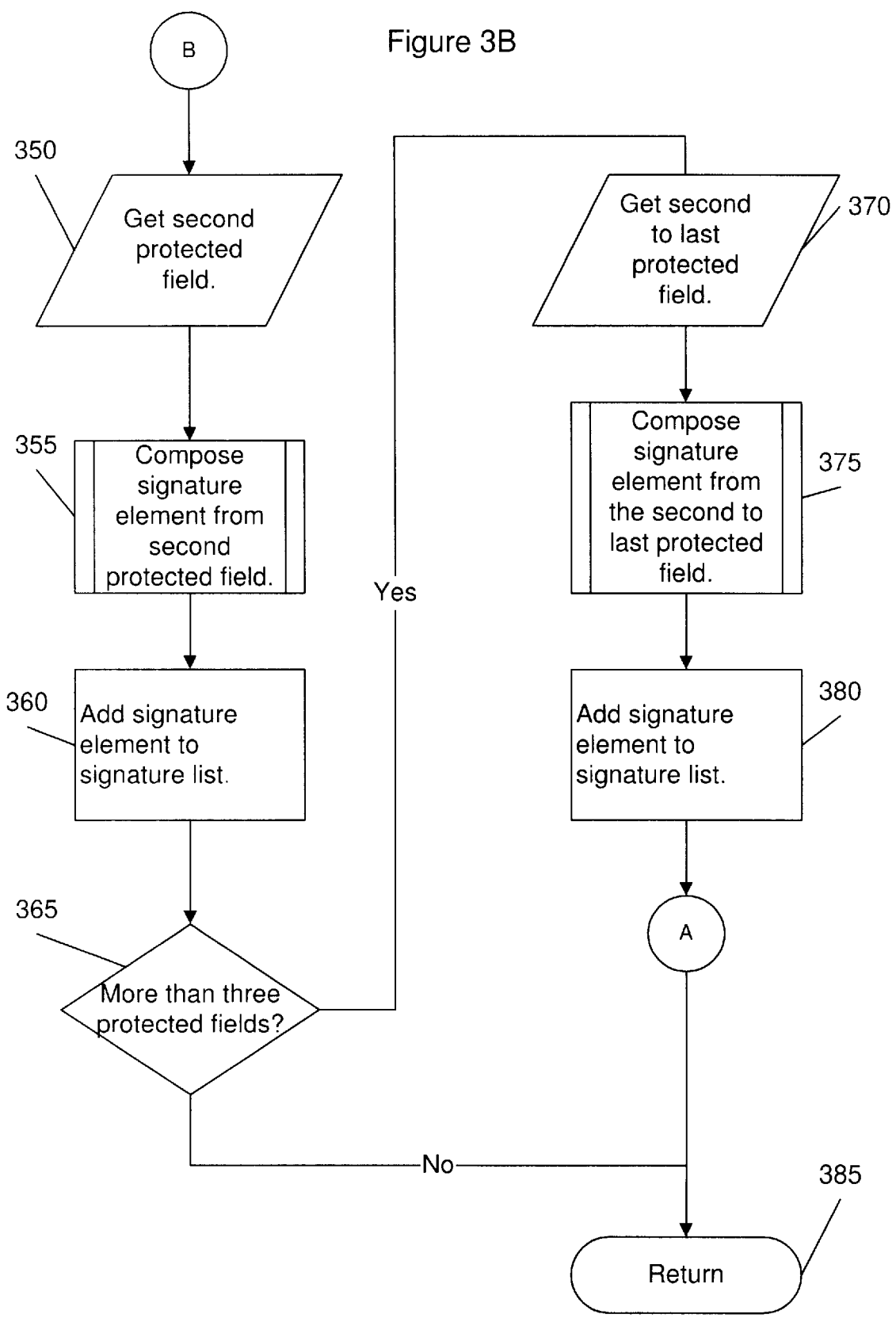

Referring now to FIGS. 3A and 3B, there are shown a flow chart of the method of composing a signature from an IBM host screen. In step 300, the method begins.

First, in step 310, it is determined whether the IBM host screen is blank. If the screen is blank, then the signature is set to NULL (step 315), and signature composition is complete (step 385).

In step 320, it is determined whether the screen has any protected fields or formatting. If not, then in step 325 the signature is set to a predetermined number of the first characters of the screen. Preferably, this number is twenty. Signature composition is then complete (step 385).

Otherwise, the first protected field of the screen is composed (step 330) and a signature element is composed for that protected field (step 335). The signature element is then placed in a signature list (step 340). The signature list, once signature composition is complete, is the signature for the screen.

If there is only one protected fields (step 345), then signature composition is complete (step 385). Otherwise, the second protected field of the screen is obtained (step 350) and a signature element is obtained for that protected field (step 355). The signature element is then added to the signature list (step 360).

The first and second protected fields are usually enough to represent the characteristics of the first half of an IBM host screen. To increase accuracy, a field from the bottom half of the reference screen is also included in the signature. Usually, if there are more than three protected fields (step 365), one will be in the bottom half of the screen. In any case, accuracy of the signature increases as more signature elements are included. However, the speed of training and recognition decreases as signature elements are added.

I have found that the last field in an IBM host screen is often common to all screens for a given application. Therefore, in order to get a field from the bottom half of the screen, it is preferred to obtain the second to last protected field of the screen (step 370) and compose a signature element from that (step 375).

The signature element is then added to the signature list (step 380). In either case, signature composition is complete (step 385).

Composing a Signature Element

Figure 4A:
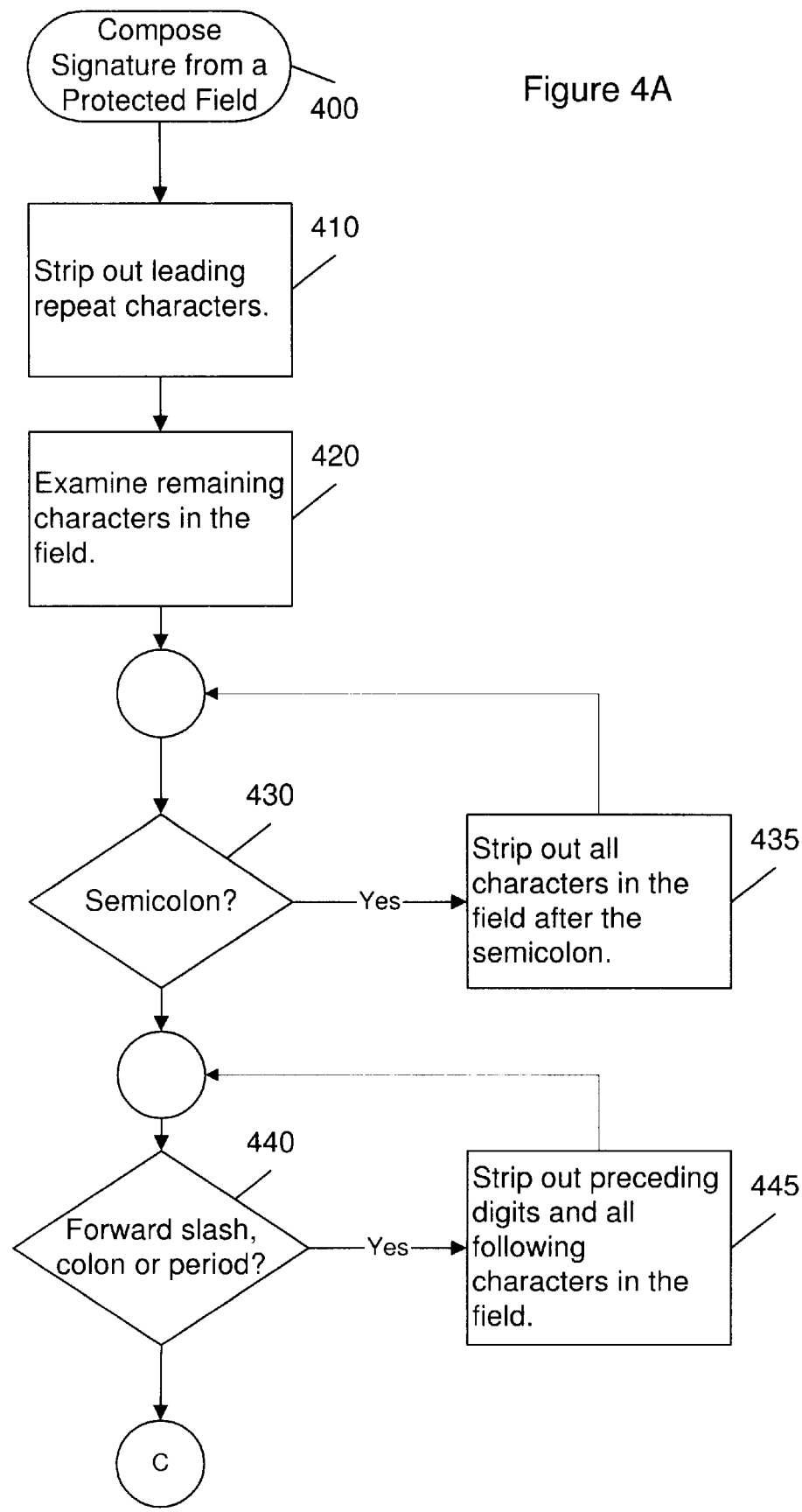
FIGS. 4A and 4B are a flow chart of a method of composing a signature from a protected field of an IBM host screen.
Figure 4B:
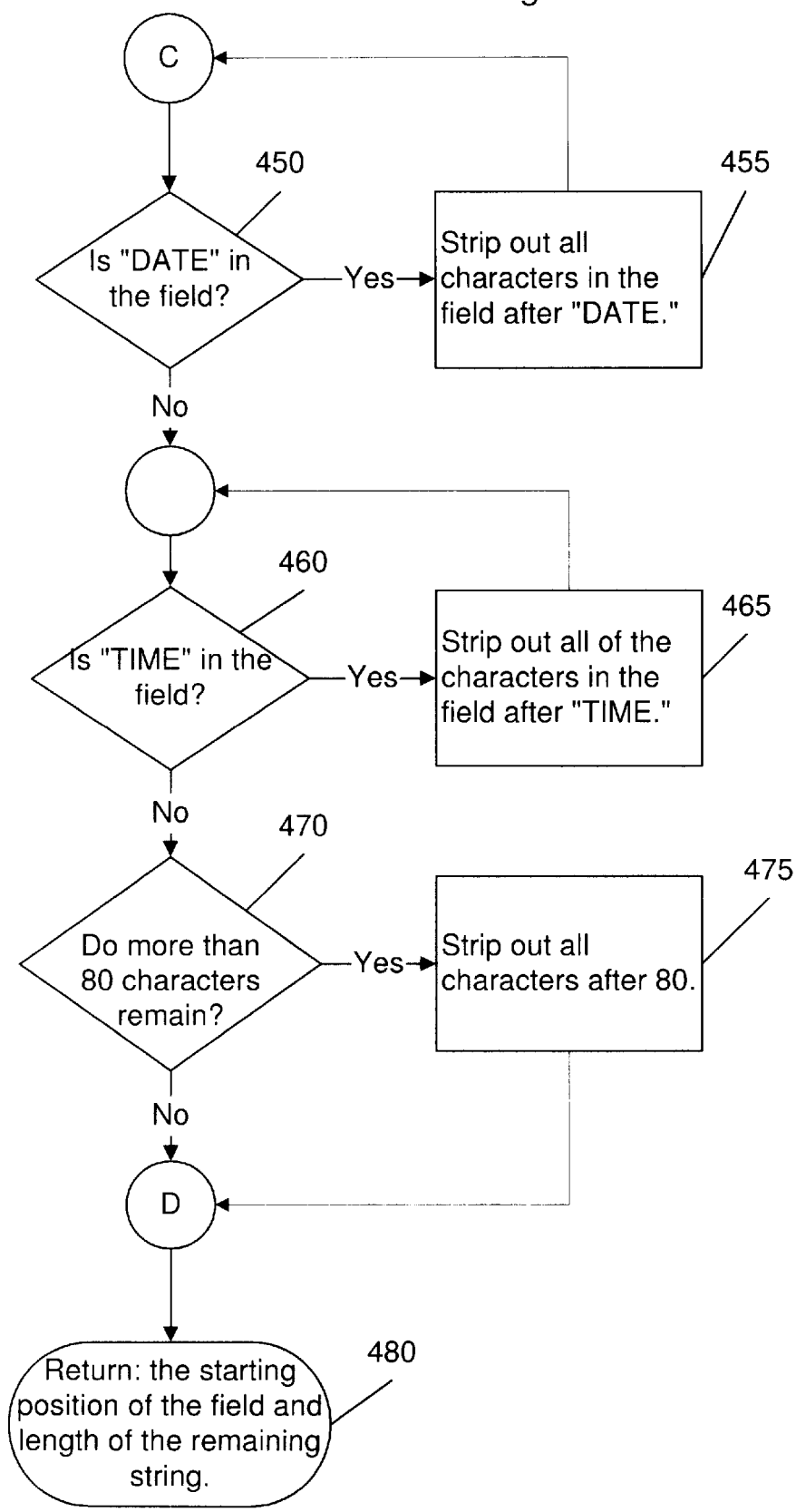

Referring now to FIGS. 4A and 4B, there are shown a flow chart of the method of composing a signature element from a protected field of an IBM host screen. In step 400, the method begins. Preferably, the contents of the field are copied from the host display session presentation space to a working buffer. The buffer is preferably in the PC's RAM.

The primary purpose of the following steps is to remove characters from the field which, if used to compose a signature element would make the signature element less reliable. After studying the contents of protected fields in numerous IBM host applications, I have found that they often contain strings of characters which change from time to time. As shown more specifically below, the preferred approach is to assume that any part of a protected field which follows an unreliable portion is ignored as well.

A number of instances in which a part of a protected field is unreliable are set forth below. However, it other instances are also within the scope of the invention. For example, names of months, names of days and any characters after them are also preferably filtered. Sometimes a protected field includes a variable, and filtering the variable is within the scope of the invention. Furthermore, manual filtering is within the scope of the invention.

Thus, the first action, step 410, is to filter out all of the leading repeat characters in the field. Typically, leading characters are dashes "-". However, the preferred step of filtering all leading repeat characters is simpler and more cautious.

Next, the remaining characters in the field are examined.

I have found that, in some IBM host environments, a "Ready" command is followed by a semicolon, and the semicolon is followed by a status string which is changed from time to time. Thus, if a semicolon is found (step 430), then all characters after the semicolon are filtered out (step 435).

If a forward slash is found (step 440), then the forward slash, all digits before the forward slash and all characters after the forward slash are filtered (step 445). This is done because typically a forward slash appears as part of a date display, such as "6/12/96." Every day, the date changes. Because the date is not constant, it should not be included in the signature element. Hence, each part of the date display is filtered from the field.

Only those characters which comprise the date could be filtered. For simplicity and out of caution, though, even more characters are filtered. Up to two digits preceding the first forward slash could be part of the date. Thus, all preceding digits are filtered. Filtering characters after the forward slash eliminates concerns about the month, day and year each being represented by one or more digits. This also will filter out the time, if as is common, it is displayed after the date.

If a colon is found (step 440), then the colon, all digits before the colon and all characters after the colon are filtered (step 445). This is done because, typically a colon appears as part of a time display, such as "8:41." Since time is never constant, it should not be included in the signature. Only those characters which comprise the time (including "a.m." and "p.m.") could be filtered. For simplicity and out of caution, the two digits before the colon and all characters after the colon are filtered instead. Filtering characters after the colon eliminates concerns about the hour or minute each being represented by one or more digits, and the seconds if they are shown. This also will filter out the date, if as is common, it is displayed after the time.

In some IBM host applications, portions of the date and time are separated by periods (e.g., 6.25.96 and 3.32 p.m.). Therefore, if a period is found (step 440), then the period and all digits before the period and all characters after the period are filtered (step 445).

If the word "DATE" (in any combination of upper and lower case) is encountered in the field (step 450), then all characters after the word are filtered (step 455). This is done because, typically if the word "date" appears in a protected field, it is because the date is displayed immediately thereafter. As explained above, the date is not constant and so should be filtered.

If the word "TIME" (in any combination of upper and lower case) is encountered in the field (step 460), then all characters after the word are filtered (step 465). This is done because, typically if the word "time" appears in a protected field, it is because the time is displayed immediately thereafter. As explained above, the time is not constant and so should be filtered.

After the unreliable portions of the field have been filtered, the field is examined again, and if more than a predetermined number of characters remain (step 470), then all characters after the predetermined number are filtered (step 475). Preferably this number is eighty. I have found that if a protected field contains a title or subtitle for a screen, then it typically will not exceed one line. One line is typically eighty characters. Picking the entire title or subtitle string is more reliable than a shorter substring, which may be common to a number of screen titles and subtitle in an application.

With the field now processed, a corresponding signature element is composed of the starting position of the field on the screen and the number of the remaining characters (step 480).

The Recognition Phase

Referring now to FIG. 2B, there is shown a flow chart of the recognition phase of screen identification. During the recognition phase, the contents of the current screen are analyzed and effectively compared against the signature of the reference screen.

In step 250 the method begins. In step 255, the protected fields stored in step 210 are retrieved. If the entire reference was stored in step 210, then the entire reference screen is retrieved. The reference table stored in step 230 is also retrieved.

Next, a loop comprising steps 260, 265 and 270 is performed to determine if the signature of the reference screen is present in the current screen. In step 260, the next record (or first record, for the first time through the loop) is obtained from the reference screen table. Then, in step 265, the record is used to compare specific portions of the reference screen and the current screen. A first string is identified amongst the protected fields of the reference screen. The first string starts at the location stored in the record and is of the length in the record. A second string is then identified in the current screen. The second string starts at the location stored in the record and is of the length in the record. The first string is then compared to the second string.

In step 275, if the strings from each pass of the loop match, then the current screen has the signature of the reference screen (step 280). Otherwise, the current screen is not the same as the reference screen (step 285).

Preferably, the corresponding strings must match exactly. However, it is within the scope of the invention that the strings could match within a certain precision. Also, the matching step could take place within the string identification loop (steps 260, 265, 270), such that if the second string does not match the first string sufficiently then it is concluded that the current screen does not have the signature of the reference screen.

The methods described above are also useful in many types of systems, including most interactive computer systems in which scripts can be produced and replayed.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

Appendix

Method of Composing Signature from an IBM Host Screen:

```
if blank screen, signature is NULL
else if no protected field in screen, pick the first 20 characters as the signature
else
    get the first protected field
        compose signature element from this field*, and add to signature list
    if more than one protected field
        get the second protected field
        compose signature element from this field*, and add to signature list
    if more than three protected fields
        get the 2nd to the last protected field
        compose signature element from this field*, and add to signature list
```

Appendix-continued

*Method of Composing Signature Element from a Protected Field

Inputs: position and length of the field
Outputs: position and length of the signature
filter out leading repeat characters
check the remaining characters in the field
    if semi-colon(';') exits in the field, filter out all the characters after it
    if forward-slash('/'), colon(';') or period('.') exits in the field, filter out the preceding
digits and all the characters after it
    if 'DATE' (not case sensitive) exits in the field, filter out all the characters after it
    if 'TIME' (not case sensitive) exits in the field, filter out all the characters after it
if the length of the remaining string is more than 80 characters long, filter out all the
chacters after 80
pass back the starting position and length of the remaining string It is claimed:

1. A computer program product comprising a computer usable medium having computer readable program code embodied therein for identifying screens, the computer program product for use by a guest computer comprising a memory, a first display, a first user input device and a first terminal emulation program, the first terminal emulation program receiving screen displays generated by a host computer and transmitted to the guest computer as logical representations in the guest computer's memory, the computer readable program code in the computer program product comprising computer readable program code for causing the guest computer to:

(a) in a training phase:
  (i) select a screen as a reference screen,
  (ii) store the contents of the reference screen in a first buffer, and
  (iii) compose and store a signature of the reference screen from the buffer, wherein:
    if the screen is blank, the signature is a predetermined value, else
    if the screen is unformatted or has no protected fields, then the signature is composed of a number of the first characters of the screen, else
    a signature element of the first protected field is composed and placed into a signature list, the signature being comprise of the signature list,
    if a second protected field is present, then a signature element of the second protected field is composed and placed into the signature list,
where decisions as to which elements to use for creating a signature and the steps of composing a signature of the reference screen from the buffer are performed automatically by the computer program;

(b) in a recognition phase:
  (i) select a current screen,
  (ii) store the contents of the current screen in a second buffer,
  (iii) compose a signature of the current screen from the buffer, and
  (iv) compare the signature of the current screen with the signature of the reference screen.

2. The computer program product of claim 1 further comprising computer readable program code for causing the guest computer to, if more than three protected fields are present, then compose a signature element of the second to last protected field and place the signature element into the signature list.

3. The computer program product of claim 1 wherein the computer readable program code for causing the guest computer to compose a signature element of a protected field comprises computer readable program code for causing the guest computer to:
  determine which portions of the protected field are unreliable,
  filter out portions of the protected field which are unreliable,
  determine which portions of the protected field might change from time to time,
  filter out portions of the protected field which might change from time to time, and
  set the signature element to be the starting position of the protected field in the screen and the number of characters remaining after filtering.

4. The computer program product of claim 3 wherein the computer readable program code for causing the guest computer to filter comprises computer readable program code for causing the guest computer to filter out all leading repeat characters in the protected field.

5. The computer program product of claim 3 wherein the computer readable program code for causing the guest computer to filter comprises computer readable program code for causing the guest computer to filter out all leading spaces.

6. The computer program product of claim 3 wherein the computer readable program code for causing the guest computer to filter comprises computer readable program code for causing the guest computer to filter out all characters after any semicolon.

7. The computer program product of claim 3 wherein the computer readable program code for causing the guest computer to filter comprises computer readable program code for causing the guest computer to filter out all digits before any forward slash and all characters after any forward slash.

8. The computer program product of claim 3 wherein the computer readable program code for causing the guest computer to filter comprises computer readable program code for causing the guest computer to filter out any characters which comprise a date.

9. The computer program product of claim 3 wherein the computer readable program code for causing the guest computer to filter comprises computer readable program code for causing the guest computer to filter out all digits before any colon and all characters after any colon.

10. The computer program product of claim 3 wherein the computer readable program code for causing the guest computer to filter comprises computer readable program code for causing the guest computer to filter out any characters which comprise a time.

11. The computer program product of claim 3 wherein the computer readable program code for causing the guest computer to filter comprises computer readable program code for causing the guest computer to filter out all digits before any period and all characters after any period.

12. The computer program product of claim 3 wherein the computer readable program code for causing the guest computer to filter comprises computer readable program code for causing the guest computer to filter out all characters after the word, without regard to case, "DATE."

13. The computer program product of claim 3 wherein the computer readable program code for causing the guest computer to filter comprises computer readable program code for causing the guest computer to filter out all characters after the word, without regard to case, "TIME."

14. The computer program product of claim 3 wherein the computer readable program code for causing the guest computer to filter comprises computer readable program code for causing the guest computer to filter out any character after the eightieth.

15. The computer program product of claim 3 wherein the computer readable program code for causing the guest computer to filter comprises computer readable program code for causing the guest computer to filter out any character after a predetermined number of characters.

16. A computer program product comprising a computer usable medium having computer readable program code embodied therein for recognizing an IBM host screen from a guest computer, the computer readable program code in the computer program product comprising computer readable program code for causing the guest computer to:

receive a signature of a reference screen;

compare a current screen to the signature of the reference screen;

wherein the signature comprises:
    if the reference screen is blank, then the signature is set to a predetermined value, else
    if the reference screen is unformatted or has no protected fields, then the signature is composed of a number of the first characters of the screen, else
    a signature element of the first protected field is composed and placed into a signature list,
    if a second protected field is present, then a signature element of the second protected field is composed and placed into the signature list,
    if more than three signature protected fields are present, then a signature element of the second to last protected field is composed and placed into the signature list.

17. The computer program product of claim 16 wherein the signature elements comprise no:

leading repeat characters in the protected field;

characters after any semicolon;

characters which comprise a date;

characters which comprise a time;

digits before any period and all characters after any period; and characters after a predetermined number of characters.

18. The computer program product of claim 17 wherein characters which comprise a date comprise digits before any forward slash and all characters after any forward slash.

19. The computer program product of claim 17 wherein characters which comprise a date comprise all characters after the word, without regard to case, "DATE."

20. The computer program product of claim 17 wherein characters which comprise a time comprise all digits before any colon and all characters after any colon.

21. The computer program product of claim 17 wherein characters which comprise a time comprise all characters after the word, without regard to case, "TIME."

22. The computer program product of claim 17 wherein the predetermined number of characters is eighty.

23. A computer program product comprising a computer usable medium having computer readable program code embodied therein for composing a signature of a screen, the computer readable program code in the computer program product comprising computer readable program code for causing a computer to:

store the screen in a buffer, if the screen is blank, then set the signature to a predetermined value, else if the screen is unformatted or has no protected fields, then compose the signature of a number of the first characters of the screen, else compose a signature element of the first protected field and place the signature element into a signature list, if a second protected field is present, then compose a signature element of the second protected field and place the signature element into the signature list, if more than three signature protected fields are present, then compose a signature clement of the second to last protected field and place the signature element into the signature list.

24. The computer program product of claim 23 wherein the computer readable program code for causing the guest computer to compose a signature element comprises computer readable program code for causing the guest computer to:

filter out all leading repeat characters in the protected field;

filter out all characters after any semicolon;

filter out any characters which comprise a date;

filter out any characters which comprise a time;

filter out all digits before any period and all characters after any period;

filter out any character after a predetermined number of characters; and set the signature element to be the starting position of the protected field in the screen and the number of characters remaining after filtering.

* * * * *